3,265,690
AMINOALKYLAMINO- AND AMINO-
ALKOXY-1,3,5-TRIAZINES
Max Matter, Muri, Bern, and Roland Glatthard, Bern,
Switzerland, assignors to Haco A.G., Bern, Switzerland
No Drawing. Filed Jan. 8, 1964, Ser. No. 336,358
Claims priority, application Switzerland, Jan. 11, 1963,
355/63
19 Claims. (Cl. 260—247.1)

The present invention relates to a novel class of compounds which are of special therapeutical value. The said class is constituted by (a) 1,3,5-triazines of the formula

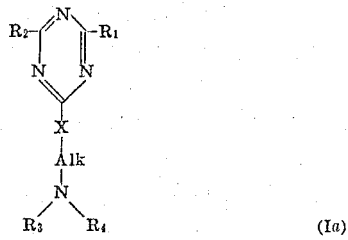

wherein
$R_1$ is chlorine, alkoxy, alkylamino, dialkylamino, pyrrolidino, piperidino or morpholino,
$R_2$ is alkoxy, alkylamino, dialkylamino, pyrrolidino, piperidino or morpholino,
X is NH or N-lower alkyl,
Alk is lower alkylene,
$R_3$ and $R_4$ each is hydrogen or lower alkyl,
$R_3$ and $R_4$ collectively with the adjacent N is pyrrlodino, piperidino or morpholino, with the proviso that the total of carbon atoms in the radicals $R_1$ and $R_2$ amounts to between 3 and 11 inclusive, and wherein $R_3$ may form a ring together with Alk or X (when X is NH); and (b) 1,3,5-triazines of the formula wherein

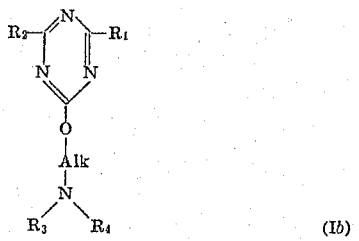

$R_1$ is chlorine, alkylamino, dialkylamino, pyrrolidino, piperidino or morpholino,
$R_2$ is alkylamino, dialkylamino, pyrrolidino, piperidino or morpholino,
Alk is lower alkylene,
$R_3$ and $R_4$ each is hydrogen or lower alkyl, and
$R_3$ and $R_4$ collectively with the adjacent N are pyrrolidino, piperidino or morpholino, with the proviso that the total of carbon atoms in the radicals $R_1$ and $R_2$ amounts to between 3 and 11 inclusive, and wherein $R_3$ may form a ring together with Alk.

An especially important sub-group of compounds of the present invention is constituted by the compounds of Formula Ib, wherein $R_1$ and $R_2$ each is alkylamino or dialkylamino with two to six carbon atoms per radical, or pyrrolidino or piperidino, Alk is an alkylene chain having 2 carbon atoms between O and the nitrogen atom to which $R_3$ and $R_4$ are linked, $R_3$ and $R_4$ each is H or lower alkyl, $R_3$ and $R_4$ collectively (+ the nitrogen atom) are morpholino, pyrrolidino or diethylamino, with the proviso that the total of carbon atoms in $R_1+R_2$ is between 5 and 9.

Finally, in preferred compounds of the present invention the basic structure is

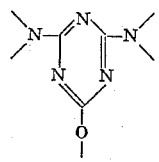

The novel triazines of this invention exhibit pronounced basic properties. With organic and inorganic acids salt formation occurs. The free bases may be converted to their acid addition salts by reacting the basic triazines with a desired acid in a solvent. Suitable acids are e.g. the halohydric acids, sulfonic acid, phosphoric acid, lactic acid, tartaric acid, alkylsulfonic acids, arylsulfonic acids, camphoric acid, mandelic acid, citric acid and malonic acid.

The corresponding hydrohalides, sulfates, phosphates, lactates, tartrates, alkylsulfonates, arylsulfonates, camphorates, mandelates, citrates and malonates, respectively, are thus formed.

The novel triazines of the present invention and their acid addition salts possess interesting pharmacological properties due to which they are valuable therapeutical agents. They decrease the appetite and therefore may be used as appetite moderating agents (anorexiants). The novel compounds show extreme activity in this respect; simultaneously, they are substantially free from side effects and thus differ advantageously from hitherto known anorexiants. Many representatives of the group of compounds comprised by Formulae I (Ia and Ib) were tested with regard to their toxicity as well as their appetite depressing activity. The first mentioned tests were carried out with mice and the latter with guinea-pigs. The appetite depressing activity was tested according to the method of K. Bucher (Helvetica Physiologica et Pharmacologica Acta 17, 334 [1959]). The results obtained from some typical representatives of the above class of compounds are listed in the following table. For comparison purposes amphetamine (1-phenyl-2-amino-propane) was also tested; corresponding results are given at the end of the table. The table reveals that the novel compounds of this invention act as anorexiants already at low dosages; further they are relatively non-toxic. The therapeutical coefficient, i.e. the quotient $$\frac{\text{Dosis letalis media}}{\text{Dosis efficax media}}$$

is extremely high and much higher than the quotient of amphetamine which today is the most widely used anorexiant. Amphetamine shows the disadvantage of simultaneously moderating the appetite and stimulating the central nervous system. The latter effect is substantially absent when using the compounds of the present invention. Accordingly these compounds are most specific anorexiants, causing no side-effects.

TABLE

| Example No. | LD₅₀ (mouse), g./kg. s.c. | Appetite moderation (guinea-pig), g./kg. s.c. | Therapeutical coefficient |
|---|---|---|---|
| 6 | 0.180 | 0.0003 | 600 |
| 8 | 1.000 | 0.0005 | 2,000 |
| 12 | 0.080 | 0.0005 | 160 |
| 13 | 0.450 | 0.015 | 30 |
| 17 | 0.500 | 0.005 | 100 |
| 22 | 0.700 | 0.010 | 70 |
| 23 | 0.500 | 0.010 | 50 |
| 24 | 0.250 | 0.005 | 50 |
| 26 | 0.150 | 0.005 | 30 |
| Amphetamine | 0.025 | 0.003 | 9 |

The triazines of Formulae I (Ia and Ib) may contain in the 2- and 4-position straight or branched saturated hydrocarbon groups in the form of alkoxy, alkylamino or dialkylamino radicals ($R_1$ and/or $R_2$). Suitable hydrocarbon groups are e.g. methyl, ethyl, propyl, isopropyl, butyl, sec. butyl, tert. butyl, amyl, octyl and nonyl. The total of carbon atoms in radicals $R_1$ and $R_2$ as already mentioned should amount to between 3 to 11 carbon atoms. Specially active compounds are obtained when $R_1$ and $R_2$ are propoxy, isopropoxy, butoxy, sec.-butoxy, tert.-butoxy, amyloxy, propylamino, isopropylamino, butylamino, sec.-butylamino, tert.-butylamino, amylamino, methylethylamino, diethylamino, methylpropylamino, ethylpropylamino, dipropylamino, pyrrolidino and piperidino, with the total of carbon atoms in $R_1$ and $R_2$ amounting to between 5 and 9 inclusive. Preferred compounds are characterized by the general Formula Ib in which "Alk" is a lower alkylene chain possessing two carbon atoms between O and the nitrogen of the side chain. $R_3$ and $R_4$ may be e.g. hydrogen, methyl, ethyl, isopropyl or butyl. Compounds in which $R_3$ and/or $R_4$ are hydrogen may be used as intermediates for the preparation of end products in which $R_3$ and $R_4$ are alkyl radicals. The transformation of such intermediates may be carried out by processes known per se in which a hydrogen atom bound to a basic nitrogen atom is replaced by an alkyl radical by means of an alkyl halide, dialkyl sulfate or sulfonic acid alkylate. Replacement of the hydrogen atoms may further be accomplished by reductive alkylation, e.g. with formaldehyde, acetaldehyde, butyric aldehyde or acetone. In the preferred compounds $R_3$ and $R_4$ together with the nitrogen atom of the side chain form a diethylamino, morpholino or pyrrolidino radical.

The compounds of Formulae I (Ia and Ib) may be prepared by several methods. The novel triazines e.g. may be obtained by condensing a compound of the general Formula II

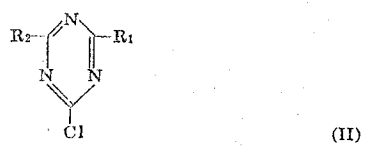

(II)

wherein $R_1$ represents chlorine, alkylamino, dialkylamino, pyrrolidino, piperidino or morpholino, and $R_2$ represents alkylamino, dialkylamino, pyrrolidino, piperidino and morpholino, with an alkali metal salt of a basic alcohol of the general Formula III

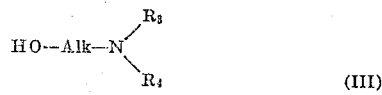

(III)

wherein $R_3$, $R_4$ and alk have the above mentioned significance.

A further process for preparing the triazines of the present invention comprises condensing a triazine of Formula II with a divalent base of the general Formula IV

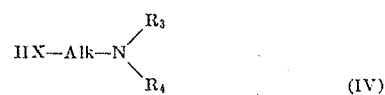

(IV)

wherein $R_3$, $R_4$ and Alk have the above significance and X is NH— or a nitrogen atom substituted by a lower alkyl radical.

A still further mode of operation consists in condensing triazines of the general Formula V

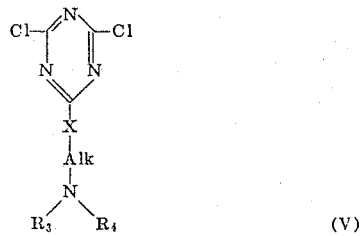

(V)

wherein $R_3$, $R_4$ and Alk have the above significance and X is NH or a nitrogen atom substituted by a lower alkyl radical with an alkali metal salt of an alkanol or with an alkylamine, dialkylamine, or with pyrrolidine, piperidine or morpholino. The condensation may either be performed by replacing both chlorine atoms of a compound of Formula V simultaneously whereby compounds of Formula I are obtained in which $R_1$ equals $R_2$, or by replacing only one chlorine atom by means of one of the above reagents to obtain a compound of Formula II in which $R_1$ is chlorine. The product of the latter reaction may be used as an intermediate which can be reacted with a reagent different from that used in the first stage to obtain a final product in which $R_1$ may be alkoxy, alkylamino, dialkylamino, pyrrolidino, piperidino, or morpholino.

The starting materials of the above processes are known or may be prepared according to known methods.

A further object of the present invention is to provide a novel method for moderating appetite. This method comprises administering to the subject whose appetite is to be moderated an anorexigenically effective amount of a 1,3,5-triazine derivative of the constitution as defined above. The novel compounds can be administered as such or, like other anorexiants, in the form of elixirs, tablets, enduret tablets, pills, capsules, perls, or dragees. Though oral administration is the preferred method for the application, the new compounds may also be administered rectally or subcutaneously. About ten to a hundred milligrams daily of the new compounds may be administered to adults in dosages of about 3 to 30 milligrams, advantageously 30 to 60 minutes before a meal.

It is a further object of the present invention to provide novel pharmaceutical preparations which depress the appetite and may be used in weight-reduction of overweight patients. The new appetite-moderating preparations contain at least one anorexigenically effective compound as defined above. The new pharmaceutical preparations may be produced by usual known methods. The new compounds of this invention or salts thereof e.g. may be admixed in a conventional manner with organic or inorganic pharmaceutical carriers suitable for enteric or parenteral use. Substances which may be used as carriers are preferably those which do not react with the new compounds such as e.g. water, gelatin, lactose, starch, magnesium stearate, talcum, vegetable oils, benzyl alcohols, rubber, propylene glycol, polyalkylene glycols, Vaseline, or other known medicinal carriers. The pharmaceutical preparations may be present e.g. as tablets, prolonged-active tablets (endurets), powders, dragees, perls, capsules, preferably in unit dosage form, or in liquid form as solutions, suspensions or emulsions. If desired they may be sterilized and/or contain auxiliary substances such as e.g. preserving, stabilizing, wetting or emulsifying agents as well as salts to change the osmotic pressure, or buffers. They may also contain other therapeutically active substances, e.g. vitamins and trace elements. The products of this invention can also be added to human food and animal feeds according to procedures well known in the art.

The present invention is further illustrated by the following examples, wherein parts by weight bear the same relationship to parts by volume as do grams to milliliters.

Example 1

1.5 parts by weight of sodium are dissolved in 40 parts by volume of 2-diethylamino-ethanol under heating and exclusion of moisture. Then the solution is cooled to a temperature of about 10 to 20° C. and 12.85 parts by weight of 2,4-bis-diethylamino-6-chloro-1,3,5-triazine are added. The slightly exothermic reaction is completed by heating the mixture to 130° C. for about 1 hour.

After cooling the reaction mixture to a temperature between 10 to 20° C. the pH-value is decreased to between 2 to 3 by addition of 4 N hydrochloric acid while maintaining the temperature below about 20° C. by addition of ice. From the resulting aqueous solution slight amounts of impurities are extracted with ether, whereafter the pH-value is raised to about 7 to 8 by addition of potassium hydroxide solution. Then 10 parts by weight of potassium carbonate are added. The reaction mixture is extracted with chloroform to obtain a chloroform solution of the 1,3,5-triazine derivative which solution is decolorized with activated carbon and freed from the solvent in vacuo. The residue is distilled in a high vacuum and yields 15.1 parts by weight of 2,4 - bis - diethylamino - 6 - (2'-diethylamino-ethoxy)-1,3,5-triazine as a colorless oil, B.P.$_{0.01}$=140° C., refractory index $n_D^{20}$=1.5061.

The new compound dissolves readily in benzene, ether, methyline chloride and methanol. It is insoluble in water and has basic properties. It combines with hydrochloric acid to form a hydrochloride. For preparing the hydrochloride one part by weight of the above base is admixed with ten parts by weight of water containing 1.4 to 1.5 moles of hydrogen chloride per mole of the triazine base.

Example 2

With exclusion of moisture 0.92 part by weight of sodium is dissolved in 50 parts by volume of 2-diethylamino-ethanol. The resulting solution is cooled to 20° C., whereafter 8.1 parts by weight of 2,4-bis-dimethylamino-6-chloro-1,3,5-triazine are added. The resulting mixture is heated for about 2 hours on a steam bath, and after cooling to room temperature (about 20–30° C.) N-hydrochloric acid is added with further external cooling until a pH-value of about 2 is obtained. The resulting solution is saturated with ammonium sulfate and extracted three times with 100 parts by volume portions of chloroform. After evaporating the chloroform in vacuo 9 parts by weight of an oily residue are obtained which crystallizes upon standing. Recrystallization from benzene containing small amounts of gasoline and from ethyl acetate yields colorless 2,4-bis-dimethylamino-6-(2'-diethylamino-ethoxy) - 1,3,5 - triazine hydrochloride, M.P.=145° C. The free base may be obtained from an aqueous solution of the hydrochloride by addition of sodium hydroxide. It is a colorless oil.

Example 3

To a sodium methoxide solution (prepared from 1.15 parts by weight of sodium and 40 parts by volume of methanol) 40 parts by volume of purified ethanolamine are added. Methanol is removed completely by evaporation in vacuo, addition of benzene and repeated evaporation in vacuo. After cooling the solution to 20° C., 13.6 parts by weight of 2,4-bis-diethylamino-6-chloro-1,3,5-triazine are added and the mixture is heated. At about 80° C. precipitation of sodium chloride occurs. The mixture is further heated to about 140° C. and retained at this temperature for about 2 hours to produce 12.5 parts by weight of 2,4-bis-diethylamino-6-(2'-aminoethoxy)-1,3,5-triazine as a highly viscous colorless oil of B.P.$_{0.01}$=153° C., which crystallizes after standing. The crystalline substance has a melting point of 71 to 73° C.

Example 4

Following the procedure of Example 1, 1.15 parts by weight of sodium, 40 parts by volume of 2-dimethylaminoethanol and 13.60 parts by weight of 2,4-bis-diethylamino-6-chloro-1,3,5-triazine are reacted to yield 13.5 parts by weight of a colorless oil which consists of 2,4 - bis - diethylamino - 6 - chloro-(2'-dimethylaminoethoxy)-1,3,5-triazine, B.P.$_{0.01}$=133° C., $n_D^{20}$=1.5091.

Example 5

To a solution of 1.15 parts by weight of sodium in 40 parts by volume of 1-diethylamino-propanol-(2) at room temperature 15 parts by weight of 2-hexylamino-4- diethlamino-6-chloro-1,3,5-triazine are added. The mixture is heated in an oil bath of 150° C. with exclusion of moisture. The product is recovered according to the method as described in Example 1. There are obtained 17 parts by weight of a light yellow oil which after distillation in the high vacuum yields a product of B.P.$_{0.01}$=174° C.; $n_D^{20}$=1.5025, and which is pure 2-hexylamino - 4 - diethylamino-6-(1'-methyl-2'-diethylamino-ethoxy)-1,3,5-triazine.

The 2-hexylamino - 4 - diethylamino-6-chloro-1,3,5-triazine used as starting material in the above example is prepared as follows: 11 parts by weight of 2-diethylamino-4,6-dichloro-1,3,5-triazine in 20 parts by volume of acetone are slowly stirred into a solution of 10.1 parts by weight of hexylamine in 20 parts by volume of acetone. The inner pot temperature is raised to 45° C., and after a short period of time a clear solution is formed. The mixture is held at 40° C. for further 30 minutes whereafter substantially all acetone is distilled off in vacuo. Then 100 parts by volume of water are added and the resulting slurry is filtered. The filter cake is washed with water and dried in vacuo at 70° C., to obtain 14.1 parts by weight of almost pure 2-hexylamino-4-diethylamino-6-chloro-1,3,5-triazine which after recrystallization from ethanol melts at 108° C.

Example 6

Following the procedure of Example 1, 1.15 parts by weight of sodium, 40 parts by volume of N-hydroxyethyl-pyrrolidine and 13.6 parts by weight of 2,4-bis-diethylamino-6-chloro-1,3,5-triazine are reacted to yield 14.1 parts by weight of a colorless oil which is 2,4-bis-diethylamino-6 - [2'-pyrrolidyl-(1'')-ethoxy]-1,3,5-triazine of B.P.$_{0.01}$=173° C., $n_D^{20}$=1.5210.

Example 7

Following the procedure of Example 1, 1.15 parts by weight of sodium, 40 parts by volume of N-hydroxyethyl-piperidine and 13.6 parts by weight of 2,4-bis-diethylamino-6-chloro-1,3,5-triazine are reacted to yield 13.5 parts by weight of a colorless oil which is 2,4-bis-diethylamino-6-[2'-piperidyl-(1'')-ethoxy]-1,3,5-triazine of B.P.$_{0.01}$=170° C., $n_D^{20}$=1.5212.

Example 8

Following the procedure of Example 1, 1.15 parts by weight of sodium, 40 parts by volume of N-hydroxyethyl-morpholine and 13.6 parts by weight of 2,4-bis-diethylamino-6-chloro-1,3,5-triazine are reacted to yield 14.4 parts by weight of a colorless oil which is 2,4-bis-diethylamino - 6 - [2' - morpholinyl - (4'')-ethoxy]-1,3,5-triazine; B.P.$_{0.01}$=179° C., $n_D^{20}$=1.5222.

This base may be converted to its hydrochloride as follows: 1 mole of 2,4-bis-diethylamino-6-[2'-morpholinyl-(4")-ethoxy]1,3,5-triazine is dissolved in N-hydrochloric acid (1 mole HCl) with gentle heating. The solution so obtained has a pH-value at 20° C. of 4.03. The solution is evaporated in vacuo to dryness while maintaining the inner pot temperature below 50° C. The residue is pulverized and dried in vacuo over phosphorus pentoxide to obtain the hydrochloride as colorless crystals, M.P. 138–140° C.

*Example 9*

Following the procedure of Example 1, 1.15 parts by weight of sodium, 40 parts by volume of 3-dimethylaminopropanol and 13.6 parts by weight of 2,4-bis-diethylamino-6-chloro-1,3,5-triazine are reacted to yield 12.8 parts by weight of 2,4 - bis - diethylamino-6-(3'-dimethylamino-propoxy)-1,3,5-triazine as a colorless oil; B.P.$_{0.01}$=142° C., $n_D^{20}$=1.5082.

*Example 10*

Following the procedure of Example 1, 1.15 parts by weight of sodium, 40 parts by volume of 3-diethylaminopropanol and 13.6 parts by weight of 2,4-bis-diethylamino-6-chloro-1,3,5-triazine are reacted to yield 13.7 parts by weight of 2,4 - bis-diethylamino-6-(3'-diethylamino-propoxy)-1,3,5-triazine; colorless oil, B.P.$_{0.01}$=170° C., $n_D^{20}$=1.5042.

*Example 11*

Following the procedure of Example 1, 1.15 parts by weight of sodium, 40 parts by volume of 1-methyl-4-hydroxy-piperidine and 13.6 parts by weight of 2,4-bis-diethylamino-6-chloro-1,3,5-triazine are reacted to obtain 13.8 parts by weight of 2,4-bis-diethylamino-6-[1'methyl-piperidyl-(4')-oxyl]-1,3,5-triazine; colorless oil, B.P.$_{0.01}$=171° C., $n_D^{20}$=1.5245.

*Example 12*

Following the procedure of Example 1, 1.15 parts by weight of sodium, 40 parts by volume of 2-diethylaminoethanol and 12.7 parts by weight of 2,4-bis-butylamino-6-chloro-1,3,5-triazine are reacted to yield 12.7 parts by weight of 2,4-bis-butylamino-6-(2'-diethylamino-ethoxy)-1,3,5-triazine; colorless oil B.P.$_{0.01}$=175° C., $n_D^{20}$=1.5150.

*Example 13*

To 10.1 parts by weight of 2,4-bis-dimethylamino-6-chloro-1,3,5-triazine, 30 parts by weight of ethylene diamine are added. The resulting mixture is refluxed for about 14 hours and then cooled to 20° C. The mixture is partitioned between benzene and aqueous potassium carbonate solution (about 36 parts by weight of potassium carbonate per 100 parts by weight of water). The benzene layer after drying over sodium sulfate is evaporated to obtain 10.8 parts by weight of white crystals consisting of raw 2,4-bis-dimethylamino-6-(2'-amino-ethylamino)-1,3,5-triazine. This product is purified by treatment with cold ethanol, filtration and evaporation of the filtrate to obtain 2,4 - bis-dimethylamino-6-(2'-amino-ethylamino)-1,3,5-triazine, which sublimes in the high vacuum. It can be recrystallized from benzene to yield colorless crystals, M.P. 90° C. The primary amino group may be converted into a dimethylamino group by methylation with formaldehyde and formic acid according to the method of Eschweiler-Clarke (cf. Ber. 38, p. 880 [1905]; Journ. of Am. Chem. Soc. 55, p. 4571 [1933]), to produce 2,4-bis-dimethylamino - 6 - (2'-dimethylamino-ethylamino)-1,3,5-triazine.

*Example 14*

10.1 parts by weight of 2,4-bis-dimethylamino-6-chloro-1,3,5-triazine, 12.8 parts by weight of 2-diethylaminoethylamine and 40 parts by volume of absolute xylene are refluxed under exclusion of moisture for about 22 hours. The mixture is cooled to about 20° C. and extracted with an aqueous solution of potassium carbonate (about 36 parts by weight of potassium carbonate per 100 parts by weight of water). After drying the mixture over anhydrous sodium sulfate, xylene is distilled off, whereafter the residue is distilled in a high vacuum to obtain 9.1 parts by weight of 2,4-bis-dimethylamino-6-(2'-diethylaminoethyl-amino)-1,3,5-triazine of B.P.$_{0.02}$=140° C. The product is a colorless oil which crystallizes on standing. M.P. of the solid product=50° C.

*Example 15*

Following the procedure of Example 14, 10.1 parts by weight of 2,4-bis-dimethylamino-6-chloro-1,3,5-triazine and 14.3 parts by weight of 3-diethylaminopropylamine in 40 parts by volume of absolute xylene are reacted to yield 10.2 parts by weight of 2,4-bis-dimethylamino-6-(3'-diethylamino-propylamino)-1,3,5-triazine in form of a colorless oil; B.P.$_{0.01}$=140° C., $n_D^{20}$=1.5322.

*Example 16*

6.1 parts by weight of 2,4-bis-dimethylamino-6-chloro-1,3,5-triazine, 7.5 parts by weight of N-methylpiperazine and 30 parts by volume of toluene are refluxed with exclusion of moisture for about 14 hours. After cooling the mixture to about 20° C., the pH is adjusted to a value between about 2 to 3 by addition of 2 N hydrochloric acid. Then 30 parts by volume of toluene are added; the mixture is shaken and then allowed to separate into two phases. The aqueous phase is treated with activated carbon and made alkaline by addition of 2 N sodium hydroxide solution, whereupon 6.8 parts by weight of 2,4-bis-dimethylamino-6-[1'-methyl-piperazinyl-(4')]-1,3,5-triazine precipitate in form of white crystals, M.P. 80° C. After sublimation in the high vacuum the melting point of the product is raised to 81° C.

*Example 17*

Following the precedure of Example 14, 12.9 parts by weight of 2,4-bis-diethylamino-6-chloro-1,3,5-triazine and 9.7 parts by weight of 2-dimethylamino-ethylamine in 40 parts by volume of absolute xylene are reacted to yield 11.6 parts by weight of 2,4-bis-diethylamino-6-(2'-dimethylamino-ethylamino)-1,3,5-triazine; colorless oil of B.P.$_{0.01}$=145° C., $n_D^{20}$=1.5239.

*Example 18*

Following the procedure of Example 14, 12.9 parts by weight of 2,4-bis-diethylamino-6-chloro-1,3,5-triazine and 12.8 parts by weight of 2-diethylamino-ethylene in 40 parts by volume of absolute xylene are reacted to yield 13.6 parts by weight of 2,4-bis-diethylamino-6-(2'-diethylamino-ethylamino)-1,3,5-triazine, which is a colorless oil of B.P.$_{0.01}$=151° C., $n_D^{20}$=1.5200.

*Example 19*

Following the procedure of Example 14, 10.3 parts by weight of 2,4-bis-diethylamino-6-chloro-1,3,5-triazine and 11.5 parts by weight of 3-diethylamino-propylamine in 40 parts by volume of absolute xylene are reacted to yield 10.9 parts by weight of 2,4-bis-diethylamino-6-(3'-diethylamino-propylamino)-1,3,5-triazine which is a colorless oil of B.P.$_{0.01}$=150° C., $n_D^{20}$=1.5277.

*Example 20*

Following the procedure of Example 14, 12.9 parts by weight of 2,4-bis-butylamino-6-chloro-1,3,5-triazine and 12.8 parts by weight of 2-diethylamino-ethylamine in 40 parts by volume of absolute xylen are reacted to yield 13.8 parts by weight of 2,4-bis-butylamino-6-(2'-diethylamino-ethylamino)-1,3,5-triazine which is a colorless oil of B.P.$_{0.01}$=188° C., $n_D^{20}$=1.5292.

*Example 21*

Following the procedure of Example 14, 10.3 parts by weight of 2,4-bis-butylamino-6-chloro-1,3,5-triazine and 11.5 parts by weight of 3-diethylamino-propylamine in 40 parts by volume of absolute xylene are reacted to yield 9.8 parts by weight of 2,4-bis-butylamino-6-(3'-diethylamino-propylamino)-1,3,5-triazine, which is a colorless oil of B.P.$_{0.01}$=196° C., $n_D^{20}$=1.5274.

Example 22

Following the procedure of Example 14, 8.4 parts by weight of 2,4-bis-piperidino-6-chloro-1,3,5-triazine and 8.6 parts by weight of 3-diethylamino-propylamine in 40 parts by volume of absolute xylene are reacted to yield 9.6 parts by weight of 2,4-bis-piperidino-6-(3'-diethylamino-propylamino)-1,3,5-triazine which is a colorless highly viscous oil, B.P.$_{0.01}$=205° C., $n_D^{20}$=1.5532.

Example 23

Following the procedure of Example 14, 8.6 parts by weight of 2,4-bis-morpholino-6-chloro-1,3,5-triazine and 8.6 parts by weight of 3-diethylamino-propylamine in 30 parts by volume of absolute xylene are reacted to yield 9.2 parts by weight of 2,4-bis-morpholino-6-(3'-diethylamino-propylamino)-1,3,5-triazine, which is a colorless oil of B.P.$_{0.01}$=195° C., $n_D^{20}$=1.5531.

Example 24

To 1.38 parts by weight of sodium dissolved in 30 parts by volume of absolute butanol, 6.0 parts by weight of 2,4-dichloro-6-(2'-diethylamino-ethylamino)-1,3,5-triazine hydrochloride (M.P.=200° C.) are added. The mixture is refluxed for one hour whereby a white precipitate is formed. Recovery of the product is effected as described in Example 1, and there are obtained 5.6 parts by weight of a colorless oil which consists of 2,4-bis-butoxy-6-(2'-diethylamino-ethylamino)-1,3,5-triazine; B.P.$_{0.01}$=160° C., $n_D^{20}$=1.4975.

Example 25

To a stirred mixture of 9 parts by weight of 2,4-dichloro-6-(2'-diethylamino-ethylamino)-1,3,5-triazine hydrochloride and 50 parts by volume of acetone a mixture of 4.4 parts by weight of diethylamine and 20 parts by volume of acetone is added in the course of 10 minutes, the temperature of the reaction mixture rising to 27° C. The colorless solution is stirred for a further hour at 30° C. whereafter the solvent is distilled off. The white crystalline residue is dissolved in N-hydrochloric acid. Slight amounts of impurities are removed by extraction with ether, whereafter under cooling potassium hydroxide is added until the H is about 7. After addition of aqueous potassium carbonate solution, white crystals precipitate which consist of pure 2-chloro-4-diethylamino-6-(2'-diethylamino-ethylamino)-1,3,5-triazine. This product has a melting point of 105° C. After recrystallization from alcohol, the M.P. is raised to 106° C.

Example 26

To 0.23 part by weight of sodium dissolved in 20 parts by volume of absolute butanol, 3.0 parts by weight of 2-chloro-4-diethylamino-6-(2'-diethylamino-ethylamino)-1,3,5-triazine are added. The mixture is refluxed for about 2 hours with exclusion of moisture. A white precipitate is formed, and after cooling the reaction mixture to 20° C., 4 N-hydrochloric acid is added to lower the pH-value to about 2 to 3. Slight amounts of impurities are extracted from the resulting mixture by means of ether. Then the pH-value is raised to about 7 to 8 by addition of potassium hydroxide solution. Then 50 parts by volume of N-potassium carbonate solution are added whereafter the triazine base so prepared is extracted from the mixture with chloroform. The chloroform solution is decolorized with activated carbon, dried over anhydrous sodium sulfate and evaporated in vacuo to obtain 3.1 parts by weight of 2-butoxy-4-diethylamino-6-(2'-diethylamino-ethylamino)-1,3,5-triazine in form of a colorless oil which crystallizes on standing for about 1 hour at 20° C. The crystals melt at 77–78° C. After recrystallization from methanol the melting point is 78° C.

Example 27

5.0 parts by weight of 2-isopropylamino-4-diethylamino-6-chloro-1,3,5-triazine and 5.8 parts by weight of N,N-dimethyl-N'-ethyl-ethylendiamine in 20 parts by volume of xylene are refluxed for 17 hours with exclusion of moisture. The mixture is cooled to room temperature and partitioned between toluene and saturated sodium carbonate solution. The toluene layer is dried over anhydrous sodium sulfate and decolorized with activated carbon. After evaporation of the solution in vacuo, 7.1 parts by weight of a light yellow oil are obtained; B.P.$_{0.02}$=130° C., $n_D^{20}$=1.5222. This product is pure 2-isopropylamino-4-diethylamino-6-[ethyl-(2'-dimethylaminoethyl)-amino]-1,3,5-triazine.

Example 28

1.15 parts by weight of sodium are dissolved in 20 parts by volume of methanol, whereafter with exclusion of moisture 15 parts by weight of 2-chloro-4-diethylamino-6-(2'-diethylamino-ethylamino)-1,3,5-triazine and 50 parts by volume of t-amyl alcohol are added. The mixture is heated in an oil bath of 120° C. for two hours and excess of methanol is evaporated. Recovery as described in Example 1 yields 14.5 parts by weight of 2-methoxy-4-diethylamino-6-(2'-diethylamino-ethylamino)-1,3,5-triazine in form of colorless crystals which after recrystallization from a 2:1 mixture of methanol and water have a M.P.=67° C.

Example 29

11.25 parts by weight of 2,4-bis-dimethylamino-6-(2'-amino-ethylamino)-1,3,5-triazine (cf. Example 13), 4 parts by weight of acetone, 0.2 part by weight of platinum oxide and 50 parts by volume of ethanol are stirred in an autoclave of chrome-nickel steel under a hydrogen pressure of 50 atmospheres. The mixture is then slowly heated to about 50 to 60° C. maintained at that temperature for four hours whereafter it is allowed to cool. Insoluble matter is removed by filtration over diatomaceous earth, and the filtrate is evaporated to yield 11.5 parts by weight of a residue which consists of raw 2,4-bis-dimethylamino-6-(2'-isopropylamino-ethylamino)-1,3,5-triazine. The substance can be distilled in the high vacuum, B.P.$_{0.02}$=140° C., $n_D^{20}$=1.5405; it is a colorless oil which on standing crystallizes spontaneously. M.P. =51° C.

Example 30

The following formula is for preparing 10,000 dragées (250 milligrams) each containing 10 milligrams of the hydrochloride of 2,4-bis-diethylamino-6-(2'-morpholinyl-(4'')-ethoxy)-1,3,5-triazine (described in Example 8):

| | |
|---|---|
| 1,3,5-triazine-derivative _____ g__ | 100 |
| Milk sugar _____ g__ | 630 |
| Starch (filler and disintegrating agent) _____ g__ | 580 |
| Talcum _____ g__ | 70 |
| Calcium stearate _____ g__ | 15 |
| Gelatin solution _____ pounds per gallon__ | 1.5 |

These compounds are granulated and pressed in 10,000 pills, each containing 10 milligrams of the 1,3,5-triazine derivative. The pills are coated with a syrup of sugar, containing calcium carbonate and a little of gum arabic and gelatin. Each dried dragée weighs 240 milligrams.

Example 31

1 part by weight of 2,4-bis-diethylamino-6-(2'-pyrrolidyl-(1'')-ethoxy-1,3,5-triazine (described in Example 6) is dissolved in 8 to 14 parts by volume of polyethylene glycol 4000 and 1 part by volume of propylene glycol. With this solution perls of gelatin are filled in such a manner, that each welded perl contains 5 milligrams of the 1,3,5-triazine derivative.

Example 32

The following formula may be employed to make capsules each containing 75 milligrams of 2-butoxy-4-diethylamino - 6 - (2'-diethylamino-ethylamino)-1,3,5-triazine (described in Example 26):

2 - butoxy - 4-diethylamino-6-(2'-diethylaminoethyl-amino)-1,3,5-triazine _____ g__ 100
Kaolin _____ g__ 50
Sucrose _____ g__ 150
Fill weight _____ mg__ 225

The capsules can be sealed and washed outside with carbon tetrachloride for removing every trace of active material.

We claim:

1. A compound of the formula

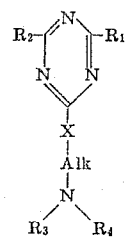

where $R_1$ is a member selected from the group consisting of chlorine, alkoxy, alkylamino, dialkylamino, pyrrolidino, piperidino and morpholino, $R_2$ is a member selected from the group consisting of alkoxy, alkylamino, dialkylamino, pyrrolidino, piperidino and morpholino, X is a member selected from the group consisting of NH and N-lower alkyl, Alk is lower alkylene, $R_3$ and $R_4$ each is a member selected from the group consisting of hydrogen and lower alkyl, $R_3$ and $R_4$ collectively with the adjacent N is a member selected from the group consisting of pyrrolidino, piperidino and morpholino, the total number of carbon atoms in the radicals $R_1$ and $R_2$ ranging between 3 and 11 inclusive, and wherein $R_3$ may form a ring together with Alk and may also form a ring with the NH variant of X.

2. A compound as defined in claim 1, wherein the total number of carbon atoms in the radicals $R_1$ and $R_2$ is between 5 and 9 inclusive.

3. 2,4 - bis - diethylamino - 6 - (2' - dimethylamino-ethylamino)-1,3,5-triazine.

4. 2,4 - bis - piperidino - 6 - (3' - diethylamino - propylamino)-1,3,5-triazine.

5. A pharmaceutically acceptable acid addition salt of a compound of the formula

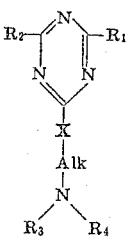

wherein $R_1$ is a member selected from the group consisting of chlorine, alkoxy, alkylamino, dialkylamino, pyrrolidino, piperidino and morpholino, $R_2$ is a member selected from the group consisting of alkoxy, alkylamino, dialkylamino, pyrrolidino, piperidino and morpholino, X is a member selected from the group consisting of NH and N-lower alkyl, Alk is lower alkylene, $R_3$ and $R_4$ each is a member selected from the group consisting of hydrogen and lower alkyl, $R_3$ and $R_4$ collectively with the adjacent N is a member selected from the group consisting of pyrrolidino, piperidino and morpholino, the total number of carbon atoms in the radicals $R_1$ and $R_2$ ranging between 3 and 11 inclusive, and wherein $R_3$ may form a ring together with Alk and may also form a ring with the NH variant of X.

6. A pharmaceutically acceptable acid addition salt of a compound as defined in claim 1, wherein the total number of carbon atoms in the radicals $R_1$ and $R_2$ is between 5 and 9 inclusive.

7. A compound of the formula

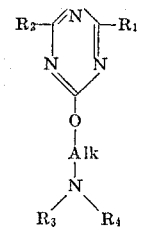

wherein $R_1$ is a member selected from the group consisting of chlorine, alkylamino, dialkylamino, pyrrolidino, piperidino, and morpholino, $R_2$ is a member selected from the group consisting of alkylamino, dialkylamino, pyrrolidino, piperidino and morpholino, Alk is lower alkylene, $R_3$ and $R_4$ each is a member selected from the group consisting of hydrogen and lower alkyl, and $R_3$ and $R_4$ collectively with the adjacent N are a member selected from the group consisting of pyrrolidino, piperidino and morpholino, the total number of carbon atoms in the radicals $R_1$ and $R_2$ ranging between 3 and 11 inclusive, and wherein $R_3$ may form a ring together with Alk.

8. A compound as defined in claim 7 wherein the total number of carbon atoms in the radicals $R_1$ and $R_2$ is between 5 and 9 inclusive.

9. A compound as defined in claim 8, which contains the grouping

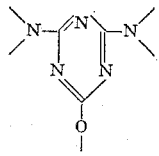

and wherein Alk comprises a chain of two carbon atoms between O and the N of the side chain, and $R_3$ and $R_4$ each is H.

10. A compound as defined in claim 8, which contains the grouping

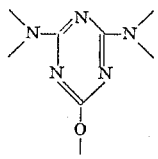

and wherein Alk comprises a chain of two carbon atoms between O and the N of the side chain, and $R_3$ and $R_4$ each is ethyl.

11. A compound as defined in claim 8 which contains the grouping

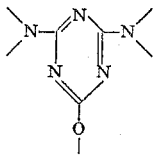

and wherein Alk comprises a chain of two carbon atoms between O and the N of the side chain, and $R_3$ and $R_4$ collectively with the adjacent N are a member selected from the group consisting of pyrrolidino, piperidino and morpholino.

12. 2,4 - bis - diethylamino - 6 - [2' - morpholinyl-(4'')-ethoxy-]-1,3,5-triazine.

13. 2,4 - bis - diethylamino - 6 - [2' - pyrrolidyl - (1'')-ethoxy]-1,3,5-triazine.

14. 2,4 - bis - butylamino - 6 - (2' - diethylamino-ethoxy)-1,3,5-triazine.

15. A pharmaceutically acceptable acid addition salt of a compound of the formula

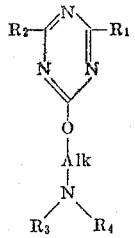

wherein $R_1$ is a member selected from the group consisting of chlorine, alkylamino, dialkylamino, pyrrolidino, piperidino and morpholino, $R_2$ each is a member selected from the group consisting of alkylamino, dialkylamino, pyrrolidino, piperidino and morpholino, Alk is lower alkylene, $R_3$ and $R_4$ is a member selected from the group consisting of hydrogen and lower alkyl, and $R_3$ and $R_4$ collectively with the adjacent N are a member selected from the group consisting of pyrrolidino, piperidino and morpholino, the total number of carbon atoms in the radicals $R_1$ and $R_2$ ranging between 3 and 11 inclusive, and wherein $R_3$ may form a ring together with Alk.

16. A pharmaceutically acceptable acid addition salt of a compound as defined in claim 7 wherein the total number of carbon atoms in the radicals $R_1$ and $R_2$ is between 5 and 9 inclusive.

17. A pharmaceutically acceptable acid addition salt of a compound as defined in claim 8, which contains the grouping

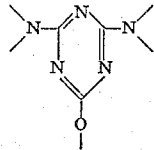

and wherein Alk comprises a chain of two carbon atoms between O and the N of the side chain, and $R_3$ and $R_4$ each is H.

18. A pharmaceutically acceptable acid addition salt of a compound as defined in claim 8, which contains the grouping

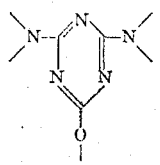

and wherein Alk comprises a chain of two carbon atoms between O and the N of the side chain, and $R_3$ and $R_4$ each is ethyl.

19. A pharmaceutically acceptable acid addition salt of a compound as defined in claim 8, which contains the grouping

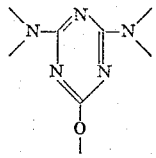

and wherein Alk comprises a chain of two carbon atoms between O and the N of the side chain, and $R_3$ and $R_4$ collectively with the adjacent N are a member selected from the group consisting of pyrrolidino, piperidino and morpholino.

References Cited by the Examiner

UNITED STATES PATENTS

| Number | Date | Name | Class |
|---|---|---|---|
| 1,915,334 | 6/1933 | Salzberg et al. | 260—243 |
| 2,075,359 | 3/1937 | Salzberg et al. | 167—22 |
| 2,425,320 | 8/1947 | Hill | 252—149 |
| 2,606,155 | 8/1952 | Hill | 252—149 |
| 2,631,119 | 3/1953 | Ferguson | 167—55 |
| 2,663,705 | 12/1953 | Parker et al. | 260—247.5 |
| 2,675,381 | 4/1954 | Craig et al. | 260—247.5 |
| 2,714,083 | 7/1955 | Ferguson | 167—55 |

HENRY R. JILES, *Acting Primary Examiner.*

JOSE TOVAR, *Assistant Examiner.*